United States Patent
Matsumae

(10) Patent No.: US 10,990,335 B2
(45) Date of Patent: Apr. 27, 2021

(54) IMAGE FORMING APPARATUS

(71) Applicant: KYOCERA Document Solutions Inc., Osaka (JP)

(72) Inventor: Keisaku Matsumae, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 230 days.

(21) Appl. No.: 16/389,608

(22) Filed: Apr. 19, 2019

(65) Prior Publication Data

US 2019/0332337 A1   Oct. 31, 2019

(30) Foreign Application Priority Data

Apr. 27, 2018   (JP) .............................. JP2018-087187

(51) Int. Cl.
    *G06F 3/12*   (2006.01)
(52) U.S. Cl.
    CPC .......... *G06F 3/1235* (2013.01); *G06F 3/1207* (2013.01); *G06F 3/1219* (2013.01); *G06F 3/1259* (2013.01); *G06F 3/1263* (2013.01)
(58) Field of Classification Search
    None
    See application file for complete search history.

(56) References Cited

U.S. PATENT DOCUMENTS

| | | | |
|---|---|---|---|
| 2010/0080640 A1* | 4/2010 | Matsushima | B65H 43/02 399/372 |
| 2017/0305703 A1* | 10/2017 | Egawa | B65H 43/06 |

FOREIGN PATENT DOCUMENTS

| | | | | |
|---|---|---|---|---|
| EP | 3070033 A2 | * | 9/2016 | ......... G03G 15/6529 |
| JP | 09083719 A | * | 3/1997 | |
| JP | 2001199628 A | * | 7/2001 | |
| JP | 2007-306084 A | | 11/2007 | |
| JP | 2010-167641 A | | 8/2010 | |
| JP | 2013-W69127 | * | 12/2013 | |
| JP | 5723827 B2 | * | 5/2015 | |
| JP | 2015121826 A | * | 7/2015 | |
| JP | 5940191 B2 | * | 6/2016 | |
| JP | 2017071510 A | * | 4/2017 | |
| JP | 6249087 B2 | * | 12/2017 | |

* cited by examiner

*Primary Examiner* — Fan Zhang
(74) *Attorney, Agent, or Firm* — Stein IP, LLC

(57) ABSTRACT

An image forming apparatus sequentially outputs on a discharge tray a sheet medium on which an image based on printing data is formed and includes a counting portion and a control portion. The counting portion counts the number of sheet medium output on the discharge tray. The control portion, when the count number of the sheet medium counted by the counting portion exceeds a prescribed threshold value, issues a warning to a user and/or interrupts output of sheet medium to the discharge tray, infers based on the printing data whether the attended time after the sheet medium is output to the discharge tray until they are removed is short or not, and, after outputting the printing data of which the unattended time is inferred to be short, decrements the count number.

18 Claims, 3 Drawing Sheets

IMAGE FORMING APPARATUS

INCORPORATION BY REFERENCE

This application is based upon and claims the benefit of priority from the corresponding Japanese Patent Application No. 2018-087187 filed on Apr. 27, 2018, the contents of which are hereby incorporated by reference.

BACKGROUND

The present disclosure relates to an image forming apparatus which forms an image on a sheet medium and outputs it.

In an image forming apparatus (printer) with a printing function of forming an image on a sheet medium (sheet), a plurality of sheets may be output for one printing job. In such a case, output sheets are sequentially stacked on a discharge tray. However, as the number of stacked sheets increases, trouble such as a fall of sheets and a sheet jam are more likely to occur. Thus, in a common configuration, when the number of stacked sheets on the discharge tray exceeds a certain amount (stackable number), output is interrupted and a warning is displayed on a display portion. In such a case, a user who has seen the warning can remove sheets and operate a cancel button so that the interrupted output may be restated.

Accordingly, a sensor for sensing a large number of sheets being stacked may be provided at the discharge tray. However, providing such a sensor causes problems such as an increase in the price of the printer, or interruption of printing due to malfunction of the sensor. Thus, a technique for achieving a similar function without such a sensor is used. This technique uses a discharge counter which, instead of counting the number of sheets stacked on the discharge tray directly, counts the number of sheets output to the discharge tray after printing. Such a discharge counter is used also for maintenance and control of the apparatus. Thus, this configuration is preferable especially to simplify the structure of the printer to make it inexpensive.

However, sheets on the discharge tray are removed by a user as necessary. Thus, in general, the stacked number of sheets on the discharge tray cannot be calculated definitively based solely on the count number from the discharge counter. Also, for efficient job handling, it is preferable to perform as little as necessary of operation such as interrupting output as mentioned above. Thus, with consideration given to the usage by a user, techniques have been proposed which, without using a sensor as mentioned above, can prevent, based on the count number by the discharge counter, a situation where a large number of sheets are stacked on the discharge tray.

For example, according to a known image forming apparatus, when a printing job is received, the total number of sheets output for the printing job is recognized. Unless this total number exceeds the stackable number, the discharge counter mentioned above is reset and no counting is performed. Only when the total number exceeds the number of sheets allowed to be stacked on the discharge tray does the discharge counter count the number. Interruption of operation and display of a warning mentioned above are performed based on the count number from the discharge counter. Herewith, when a printing job is executed for which the total number of sheets to be output is so large that the number of stacked sheets is inferred to exceed the stackable number, interruption of output or issuance of a warning as mentioned above can be performed. On the other hand, a printing job for which the total number of sheets to be output is so small that the number of stacked sheets is inferred not to exceed the stackable number can be executed efficiently.

For another example, according to a different known image forming apparatus, the above-mentioned discharge counter is used as a stacked number counter. After output is interrupted as mentioned above, when operation is restated, the counter is reset. Thus, the count number is inferred to equal the number of stacked sheets on the discharge tray. When a new printing job is later executed, the total number of sheets to be output for the printing job is recognized. If the sum of the count number and the total number at this point exceeds the stackable number, the printing job is excluded from execution. Herewith, while a printing job for which the number of stacked sheets is inferred to exceed the stackable number is excluded from execution, a printing job for which the total number of sheets to be output is small can be performed efficiently.

In the image forming apparatus which recognizes, when a printing job is received, the total number of sheets to be output for the printing job, if the sheets output by this job are removed from the discharge tray immediately after output of a printing job is finished, the above-mentioned judgement is made properly. On the other hand, when a new printing job is executed continuously without the sheets being removed, the number of stacked sheets on the discharge tray may exceed the stackable number. In other words, this technique assumes that the judgement is made for each job and the sheets output for each printing job are removed immediately. Thus, it is not possible to prevent a situation where a large number sheets output for a plurality of printing jobs are left and stacked on the discharge tray.

In the image forming apparatuses in which the discharge counter is used as a stacked number counter, the control mentioned above is performed with the count number associated with the stacked number, and thus the problem such as the one mentioned above does not occur. However, the judgement is, likewise, made for each printing job. In a case where a judgement is made for each printing job in this way, when, for example, rendering processing is performed for a printing job, the total number of sheets to be output for this printing job may not be recognized until the rendering processing is finished. Making this judgement may take time, and thus the printing job may not be executed efficiently.

Moreover, when a plurality of users use the image forming apparatus, for example, interrupt processing may be performed in which, during output of one printing job, another printing job is given priority to be executed and output first. In this case, the actual status of output is different from when the above judgment was made, and thus a proper judgement may not be made, resulting in the stacked number on the discharge tray exceeding the stackable number.

Thus, it is desired to prevent, without spoiling job handling efficiency, output of the number of sheets from exceeding the stackable number from accumulating on the discharge tray.

The present invention has been made to solve the above problems and its object is to provide a technology which can solve those problems.

SUMMARY

According to one aspect of the present disclosure, an image forming apparatus sequentially outputs on a discharge tray a sheet medium on which an image based on printing data is formed and includes a counting portion and a control portion. The counting portion counts the number of sheet medium output on the discharge tray. The control portion, when the count number of the sheet medium counted by the counting portion exceeds a prescribed threshold value, issues a warning to a user and/or interrupts output of the sheet medium to the discharge tray, infers based on the printing data whether the attended time after the sheet medium is output to the discharge tray until they are removed is short or not, and, after outputting the printing data of which the unattended time is inferred to be short, decrements the count number.

This and other objects of the present disclosure, and the specific benefits obtained according to the present disclosure, will become apparent from the description of embodiments which follows.

DETAILED DESCRIPTION

Figure 1:
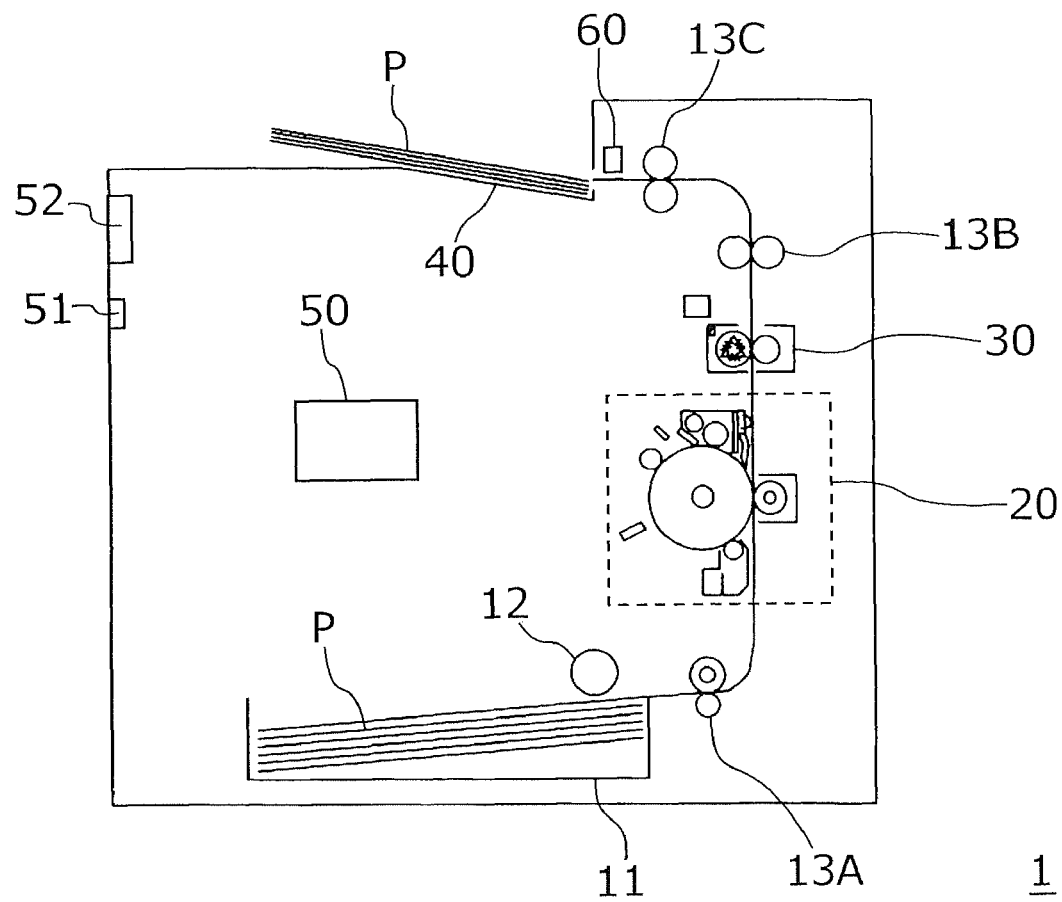
FIG. 1 is a diagram showing mainly a mechanical structure of an image forming apparatus according to an embodiment of the present disclosure.

Embodiments of the present disclosure will be described below with reference to the accompanying drawings. FIG. 1 is a diagram showing, in a simplified form, mainly the overall mechanical structure of an image forming apparatus 1 according to an embodiment of the present disclosure. The image forming apparatus 1, as will be described later, is provided also with a function for reading a document optically. However, here, only the structure for forming and outputting an image on a medium (sheet P) is shown in a simplified form. In the image forming apparatus 1, sheets P stored in a sheet feeding cassette 11 are conveyed to an image forming portion 20 by a pick-up roller 12 and a conveying roller 13A. In the image forming portion 20, while a sheet P is being conveyed upward in the diagram, an image pattern formed with toner is transferred to the sheet P. The structure of the image forming portion 20 is similar to that in well-known image forming apparatuses. This image forming apparatus 1 performs monochrome output, and thus, in the example shown in FIG. 1, a single image forming portion 20 for black is provided. However, in a structure for outputting color images, one image forming portion is provided for each of different colors, and the image patterns of different colors formed in the respective image forming portions are transferred onto a single sheet P.

A sheet P to which an image pattern formed with toner has been transferred passes through a fixing unit 30 above, and is pressed and heated there. Thus, the toner forming the image pattern fixes to the sheet P. The sheet P is then discharged to a discharge tray 40 above by conveying rollers 13B and 13C.

The image forming apparatus 1 includes a control portion 50. The control portion 50 is provided with a CPU which controls the different parts mentioned above to make them perform the above-mentioned operation smoothly. A user operates an operation panel 51 to make the control portion 50 operate as instructed. The operation panel 51 is located in a topmost part of the image forming apparatus 1 and is provided with a plurality of operation keys. The control portion 50 can make a display portion 52 which has a display indicate various kinds of information or display warnings to a user.

Here, in a discharge path, at a position where a sheet P passes immediately before being discharged to the discharge tray 40, a discharge counter 60 is provided. The discharge counter 60 counts the number of sheets P which pass through the discharge path. The discharge counter 60 senses both ends of a sheet P in the conveying direction optically or mechanically, thereby to recognize the passage of the sheet P when it passes by the discharge counter 60. Thus, every time a sheet P is recognized there, the control portion 50 can recognize the cumulative number of sheets P. The discharge counter 60 and the control portion 50 function as a counting portion for recognizing the cumulative number (count number) of sheets. The output sheets P are stacked on the discharge tray 40. This stacked number of sheets P can be associated with the count number. The control portion 50, as will be described later, performs operation of making the count number zero based on a judgement.

Figure 2:
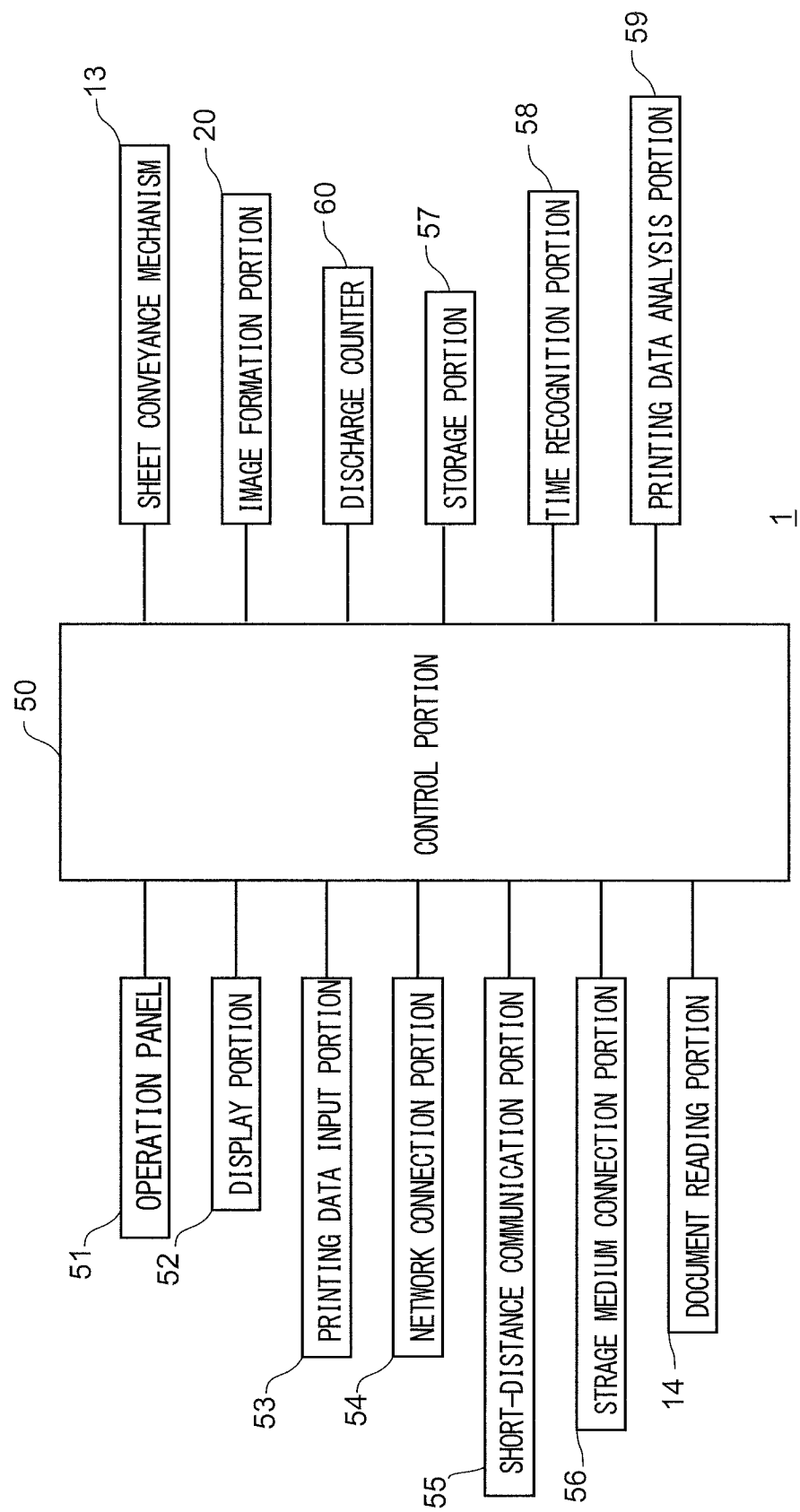
FIG. 2 is a block diagram showing mainly a functional structure of the image forming apparatus according to the embodiment of the present disclosure.

FIG. 2 is a block diagram showing mainly the functional structure of the image forming apparatus 1. Here, the pick-up roller 12, the conveying rollers 13A, 13B, and 13C, and the like in FIG. 1 are shown as a sheet conveyance mechanism 13. While FIG. 2 shows a document reading portion 14, a printing data input portion 53, a network connection portion 54, a short-distance communication portion 55, a storage medium connection portion 56, a storage portion 57, a time recognition portion 58, and a printing data analysis portion 59, these are omitted in FIG. 1.

The printing data input portion 53, for example via the network connection portion 54, connects with an external personal computer across a network, thereby to receive a printing job from there across the network to acquire printing data. Likewise, via the short-distance communication portion 55, the printing data input portion 53 can acquire printing data also from a mobile terminal (a smartphone or the like) by a short-distance wireless communication such as NFC (near-field communication). Based on such printing data, the control portion 50 controls the image forming portion 20 and the sheet conveyance mechanism 13 to make them form an image on a sheet P and output it to the discharge tray 40. Similarly, the printing data input portion 53 can make the storage medium connection portion 56 acquire an image file from, for example, a storage medium (unillustrated) connected via a USB port, to form the image in the image file on a sheet P and output it. The image forming apparatus 1 also includes the document reading portion 14 which reads a document optically to acquire image data, and a copying function whereby an image is formed on a sheet P and is output. With the copy function, it is possible to form and output a single image on a large number of sheets P. This applies also in a case where externally-acquired printing data is used.

For operation during printing, various settings are made. The control portion 50 makes the image forming apparatus 1 operate based on these settings. For example, when a user is performing output on a large number of sheets P using the copying function, another user can interrupt it and perform interrupt operation for urgent output. Such interrupt operation is similar to, for example, what is disclosed in Japanese Patent Application published as No. 2017-185749. When output on a large number of sheets is performed, also "test printing" is possible. In test printing, only the first sheet is output first, and after a user checks it and readjusts printing parameters, output on all the sheets including the first one is again performed. Such test printing is similar to, for example, what is disclosed in Japanese Patent Application published as No. 2017-196806. These kinds of operation are set by user operation or the like on the operation panel 51.

There is also provided the storage portion 57 comprising a semiconductor memory or a hard disk for storing various kinds of data required in performing the operation described above. The storage portion 57 can temporarily store also the above-mentioned printing data. In addition, the time recognition portion 58 for recognizing the current time is provided. With the time recognition portion 58, the control portion 50 can recognize, for example, the time point when the operation panel 51 is operated, the time point when the discharge counter 60 recognizes a sheet P, and the lapse of time after the recognized time point.

The image forming apparatus 1 includes a printing data analysis portion 59. The printing data analysis portion 59 recognizes characters and symbols included in a formed image. The printing data analysis portion 59 recognizes characters and symbols in an image by a well-known pattern recognition method. The control portion 50, as will be described later, can control the operation of the image forming apparatus 1 based on the characters and symbols in the recognized image.

Here, in addition to a printing job received from a personal computer or a mobile terminal as described above, operation for forming and outputting an image on a sheet P such as, for example, operation for copying and outputting a document image on one or more sheet is also called a printing job for convenience. Here, operation executed by a user's single operation, as in a case where a document is copied across a plurality of pages, is regarded as a single printing job using a single set of printing data.

When operation in which a sheet P is output to the discharge tray 40 by a printing job is repeated and the number of sheets P stacked on the discharge tray 40 becomes too large, trouble such as a fall of sheets and a sheet jam are more likely to occur. To cope with that, the control portion 50 infers the number of stacked sheets every time a sheet P is output, and when the number of stacked sheets is judged to exceed the allowed number (stackable number), the control portion 50 interrupts the operation of the image forming portion 20 and the sheet conveyance mechanism 13 and indicates a warning on the display portion 52. Or, the control portion 50 transmits the warning, via the network connection portion 54 and the short-distance communication portion 55, to the personal computer and the mobile terminal from which the printing job has been transmitted. This image forming apparatus 1 is characterized by the operation that the control portion 50 performs when inferring the number of stacked sheets. This operation will now be described.

In general, after a printing job is executed, a user removes the output sheets P from the discharge tray 40 after a certain time (unattended time) passes. When a plurality of sheets P are output in one printing job, in general, all the sheets P are removed at once. Thus, the unattended time can be considered for each printing job or each set of printing data. For example, if the unattended time for a printing job is long, the sheets P output for this printing job are left on the discharge tray 40 for a long time. Then, when sheets P output for another printing job are added, the number of stacked sheets may become so large as to exceed the stackable number.

On the other hand, when the unattended time for a printing job is short, the sheet P output for this printing job is removed from the discharge tray 40 in a short time after output. In such a case, even if, for example, there was a sheet P which was output before this printing job but has been left on the discharge tray 40 due to the long unattended time, it can be inferred that all the sheets P will be removed at once. That is, with consideration given to the unattended time as mentioned above, the status of the stacked number of sheets on the discharge tray 40 can be inferred. When the unattended time is, instead of being given a specific value, simply classified into two kinds, i.e., long and short, it is possible to make an inference as follows.

First, if it is clear that a user who has transmitted a printing job is present near the image forming apparatus 1 during transmission of the printing job, the unattended time of this printing job can be inferred to be short. For example, if a printing job is received via the short-distance wireless communication, it can be inferred that a user has moved close to the image forming apparatus 1 to perform this printing operation. Thus, the unattended time is inferred to be short. This applies also to the output of printing for which an image file is acquired via a storage medium connected to the storage medium connection portion 56. Similarly, a personal computer connected via a network can be identified based on its IP address; then, for example, for the output for a printing job from the personal computer that is close to the image forming apparatus 1, it can be inferred that the unattended time is short. Or, when a user setting is made on the image forming apparatus 1 and the control portion 50 can recognize the user, it is possible to infer that the unattended time of the output for a printing job performed by a certain user is short. Also in that case, the control portion 50 can recognize that. That is, the control portion 50 can, based on the transmission source of the printing job, infer whether the unattended time of the output for the printing job is short or not.

Or, as in a case where copying of a document is performed, if this printing job is started by user operation on the operation panel 51 and all output for this printing job is output to the discharge tray 40 in a short time, it can be inferred that the user has stayed close to the image forming apparatus 1 continuously since the time of the operation. Thus, the unattended time is inferred to be short. In this case, the time interval between the above-mentioned time point of the operation on the operation panel 51 and the time point when the output of the last sheet P for this printing job is recognized by the discharge counter 60 is counted. If this time interval is equal to or shorter than a prescribed value, it can be inferred that the unattended time is short. In this case, the control portion 50 recognizes these time points with the time recognition portion 58, thereby to recognize the time interval. That is, the control portion 50 can, based on the timing when the operation panel 51 has been last operated, infer whether the unattended time for the printing job initiated by this operation is short or not.

This inference can be made also based on the settings for operation when a printing job is executed. First, when interrupt operation as mentioned above is set, this printing job is inferred to have high urgency, and thus the unattended time is inferred to be short. Or, if the above-mentioned test printing is performed, it can be inferred, from its purpose, that at least the output of the first sheet is urgent. In this way, for output which is inferred to be urgent, the unattended time can be inferred to be short. That is, based on the function which is set during output on the image forming apparatus 1, it is possible to infer whether the unattended time is short or not. The control portion 50 controls the image forming apparatus 1 based on the setting of such functions, and thus when the functions as mentioned above are set, it can be inferred that the unattended time is short.

If a personal computer or a mobile terminal which is the transmission source that has transmitted a printing job can recognize its own position, and the position information can be recognized also from the image forming apparatus 1 side, the image forming apparatus 1 can recognize the distance between itself and the transmission source. When this distance is recognized to be short, the unattended time may be inferred to be short. The time point when sheets P are actually removed from the discharge tray 40 can be inferred to be the time point when the discharge tray 40 becomes empty. Thus, where there is provided a sensor which recognizes the emptying of the discharge tray 40, it is possible to recognize this time point. After the transmission source is recognized and the output for a printing job from this transmission source is performed, the time point when the output sheets P are removed from the discharge tray 40 can be inferred to be the time point when the discharge tray 40 becomes empty. Herewith, it is possible to count the actual unattended time of the output from the above-mentioned transmission source. Thus, where there is provided a sensor which recognizes the emptying of the discharge tray 40, it is possible to recognize the actual unattended time of the output for a printing job from this transmission source. When the actually counted unattended time of output in the past has been recognized to be short, it can be inferred that also the unattended time of the output for a new printing job from this transmission source will be short.

Or, for example, when information including confidential matters is printed, it is not preferable that the output sheet P is left on the discharge tray 40 for a long time, and thus, in general, the unattended time is short. This also applies in a case where there are many users and contents including personal information are being printed. Thus, when such information is included in the printed contents, the unattended time of the sheet P output for this printing job can be inferred to be short. That is, depending on the contents of the image to be printed, whether the unattended time will be short or not can be inferred.

Thus, using the printing data analysis portion 59, the control portion 50 recognizes characters and symbols in an image to be printed out of the acquired printing data, and checks whether they include contents as mentioned above or not. Herewith, if the control portion 50 recognizes prescribed character strings (specific character strings) such as "confidential", "secret", and "no copying", it can be inferred that the unattended time of the output for this printing data is short. This also applies in a case where it is recognized that personal information such as a date of birth and an address is included. In this case, as the specific character strings mentioned above, for example, "date of birth", "address", and "domicile of origin" can be set. The same applies in a case where a specific symbol which indicates confidentiality is recognized. A database including the specific character strings and the specific symbols used for this check can be stored in the storage portion 57 shown in FIG. 2.

In this way, the control portion 50 can, based on the printing job (printing data), infer whether the unattended time is short or long as described above. Here, a printing job of which the unattended time is inferred to be short is referred to as a specific printing job, and its printing data is referred to as specific printing data.

Here, the control portion 50 recognizes by referring to the discharge counter 60 the number (count number) of sheets P output on the discharge tray 40. Thus, every time a sheet P is output, the count number is incremented by one. However, the control portion 50 checks, when printing data is input, whether this printing job (printing data) is a specific printing job (specific printing data) as mentioned above or not, and if the printing job (printing data) is recognized to be a specific printing job (specific printing data), resets the count number (sets it at zero) after output. In this case, since the unattended time of the output for this printing data is short, the sheets P on the discharge tray 40 including the ones that have been left there from earlier on are inferred to be going to be removed in a short time (immediately after output). If all the sheets P are removed at this point and then the count number is counted starting at this time point, the count number is equal to the actual number of stacked sheets on the discharge tray 40.

Thus, the count number in this case is considered equal to the number of stacked sheets P on the discharge tray 40. The control portion 50 recognizes the count number every time it thereafter outputs a sheet P on the discharge tray 40, and if the count number exceeds the stackable number, the control portion 50 can interrupt the operation of the image forming portion 20 and the sheet conveyance mechanism 13 and issue a warning accordingly.

Figure 3:
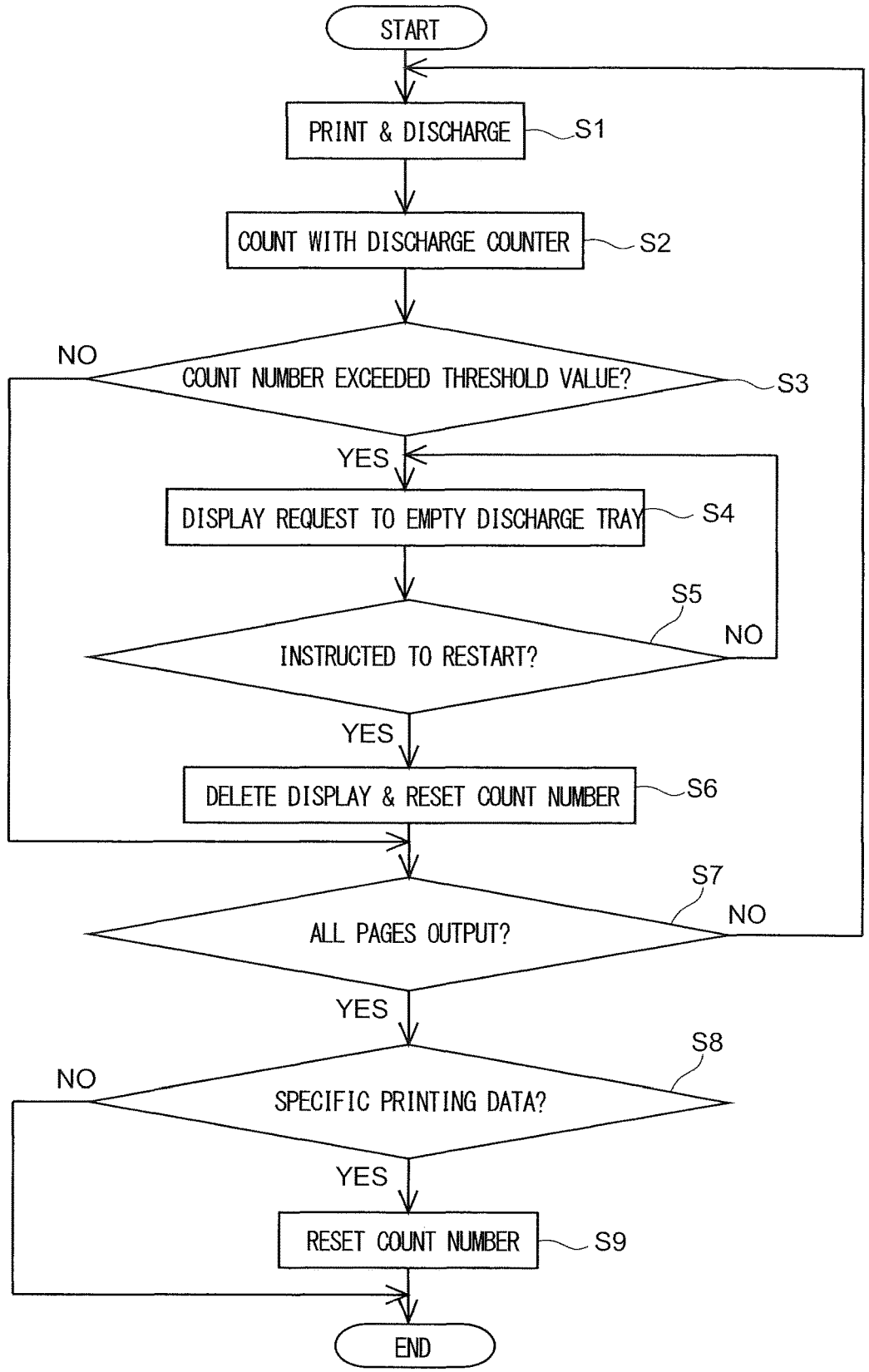
FIG. 3 is a flow chart showing operation of the image forming apparatus according to the embodiment of the present disclosure.

FIG. 3 is one example of a flowchart illustrating the operation of the control portion 50 in that case. This operation is performed every time printing data is input. Here, the control portion 50 first controls the image forming portion 20 and the sheet conveyance mechanism 13, and forms an image on a sheet P to output it on the discharge tray 40 (S1). Meanwhile, if duplex printing is set, after duplex printing is performed, the sheet P is conveyed to the discharge tray 40. Immediately before the sheet P reaches the discharge tray 40, if the discharge counter 60 recognizes the sheet P, the control portion 50 increments the count number and recognizes the resulting count number (S2). If it is recognized that this count number has exceeded a prescribed threshold value (the stackable number) (S3, Yes), the control portion 50 displays a warning (S4) to a user on the display portion 52 requesting the user to remove all the sheets P on the discharge tray 40 and then operate a cancel button provided on the operation panel 51 to enter an instruction to restart. The display may be accompanied by a sounded alarm. Herewith, until an instruction to restart is entered (S5, Yes), printing operation is stopped.

Then, when the control portion 50 confirms that the user has operated the cancel button as instructed (S5, Yes), the control portion 50 deletes the above-mentioned display on the display portion 52, and sets the above-mentioned count number at zero (S6). Herewith, when printing operation restarts, the count number is zero. On the other hand, if the count number is equal to or smaller than the above-mentioned threshold value (S3, No), the above-mentioned display and the like (S4, S5, and S6) are not performed, and printing operation is not interrupted. When it is recognized that the count number exceeds the threshold value (S3, Yes), if the cancel button is not operated (S5, No), the above-mentioned display (S4) continues to be shown, and until it is recognized that the cancel button has been operated (S5, Yes), the output of the subsequent page is not performed. When the count number is equal to or smaller than the threshold value (S3, No), or when the count number exceeds the threshold value (S3, Yes) but the subsequent processing (S4 to S6) is performed, unless all the pages in this printing job have been output (S7, No), the output of the subsequent page (S1) is performed. The operation described above is repeated until all the pages in this printing job are output (S7, Yes).

When the output of all the pages is performed (S7, Yes) as described above, the control portion 50 checks, as described above, whether this printing job (printing data) is a specific printing job (specific printing data) or not (S8). As mentioned previously, based on the function used when this printing job is executed, the transmission source of this printing job, or the presence or absence of a specific character string or specific symbol as mentioned above in the image found by the printing data analysis portion 59, or the like, the control portion 50 recognizes whether this printing data is specific printing data or not (S8). If this printing data is recognized as specific printing data (S8, Yes), the control portion 50 sets the above-mentioned count number at zero (S9), and the processing for this printing job is finished. If it is recognized this printing data is not specific printing data (S8, No), the control portion 50 leaves the count number as it is, and the processing is finished.

In this operation, the judgement of whether the output printing data is specific printing data or not is made for each set of printing data (S8), whereas the judgement based on the count number of whether operation should be interrupted or not (S3) is, unlike in conventional technology, made every time when a sheet P is output. Thus, even in a case, for example, where the number of stacked sheets has increased due to output for a plurality of printing jobs being accumulated on the discharge tray 40, operation can be interrupted properly. In this operation, the judgement of whether the output printing data is specific printing data or not (S8) is made for each printing job. For this judgement, for example, analysis by the printing data analysis portion 59 is necessary, and this may take time. However, this judgement (S8) is performed after all the output for this printing job is finished (S7, Yes), and thus the time required for this judgement (S8) does not affect the speed of execution of the printing job. Thus, printing operation is performed efficiently.

In conventional image forming apparatuses, when interrupt processing is performed as described above, a proper judgement may not always be made. On the other hand, in the image forming apparatus 1, after a printing job by interrupt processing is executed, the count number is always set at zero (S9). After this printing job is finished, the sheets P are likely to be removed from the discharge tray 40 immediately, and if the sheets P are removed, the above-mentioned count number accurately reflects the number of stacked sheets on the discharge tray 40. Thereafter, also in the restarted operation for a printing job which was interrupted by interrupt processing, indication of a warning based on the count number (S4) and interruption of operation are performed based on the judgement for each page (S3).

In the above example, after a specific job is executed, it is inferred that a user will remove all the sheets P on the discharge tray 40, and thus the count number is set at zero (89). However, a user may, from the discharge tray 40, selectively remove only the sheets P output for the specific printing job. Thus, here, the count number may be, instead of being set at zero, decremented by the number of sheets printed for the specific printing job. In this case, if a user removes not only the sheets P output for the specific printing job but all the sheets P from the discharge tray 40, the actual number of stacked sheets on the discharge tray 40 thereafter is smaller than the recognized count number (S2). Accordingly, a judgement that the output has exceeded the stackable number (S3) and a warning that the output has exceeded the stackable number (S4) are thereafter given before the number of stacked sheets actually exceeds the stackable number; thus, all the same, the number of stacked sheets is prevented from exceeding the stackable number.

Also to be considered is, in practice, the operation of removing sheets P from the discharge tray 40 requires a certain length of time, and thus the unattended time mentioned above, no matter how short, does not ever equal zero. Thus, in order to make the count number at each time point in the flow chart in FIG. 3 close to the actual number of stacked sheets, when printing data is recognized to be specific printing data (S8, Yes), it is preferable to set a certain length of time (delay time) before decrementing (resetting) the count number (S9), after recognition. It is preferable that the delay time be shorter than the time before the start of the output for the subsequent printing job. Thus, the delay time can be set, for example, at 5 to 30 seconds. Thus, in the flow chart in FIG. 3, it is preferable that the above-mentioned delay time can be set within the above range. A configuration is also possible where, for example, the delay time can be set on the operation panel 51. Here, the control portion 50 can recognize the lapse of time after the time point when the output of the last sheet P for the target printing job is recognized by the discharge counter 60, and when this lapse of time exceeds the set delayed time, the control portion 50 can decrement the count number (S9).

In the above configuration, it is possible, instead of providing a sensor for recognizing the actual stacked number of sheets P on the discharge tray 40, to perform the operation described above by using the discharge counter 60 for recognizing sheets P to be output. In general, image forming apparatuses (printers) are provided with such a discharge counter for their maintenance and control. Using it, the image forming apparatus 1 described above can execute the above-mentioned operation. Accordingly, the image forming apparatus 1 can be made inexpensive. In this case, the count number of the discharge counter is reset (set at zero) during the initial setting of an image forming apparatus and it is not reset thereafter, and thus the cumulative number of all output sheets is calculated as a count number. In this case, the count number recognized by the control portion 50 is set separately from the count number (cumulative number of all output sheets) recognized by the discharge counter. Thus, with the above-mentioned count number recognized based on the cumulative number of all output sheets recognized by the discharge counter 60, the operation described above can be executed. In the decrementing processing (S9) of the count number when printing data is recognized as specific printing data as mentioned above, two count numbers can be calculated, one for a case where the count number is set at zero at the point and the other for a case where the count number is decremented by the number of sheets output for the printing job. It is then possible to let a user select which processing to apply.

In the above example, when interrupt processing or trial printing is performed, the unattended time is inferred to be short, but even when other functions are used, if urgency of output is inferred in view of the use of the function, the unattended time can likewise be inferred to be short. When the position of a user who has transmitted the printing job, especially the positional relationship between the user and the image forming apparatus, can be recognized, and thereby the user is recognized to be present close to the image forming apparatus, the unattended time can likewise be inferred to be short. Also for specific character strings and specific symbols in an image, any other than those mentioned as examples above, of various kinds, can be set.

In the above example, when it is recognized that the count number has exceeded the stackable number, a warning is issued and output operation is interrupted. However, above configuration is effective as long as a user can recognize the situation. For example, even if no warning is issued, the user can recognize the situation when output is interrupted. Thus, when it is recognized that the stackable number has been exceeded, it is possible either to issue a warning or alternatively interrupt printing output.

What is claimed is:

1. An image forming apparatus which sequentially outputs on a discharge tray a sheet medium on which an image based on printing data is formed, comprising:
    a counting portion which counts a number of sheet medium output on the discharge tray; and
    a control portion which
        when a count number of the sheet medium counted by the counting portion exceeds a prescribed threshold value, issues a warning to a user and/or interrupts output of the sheet medium to the discharge tray,
        infers based on the printing data whether an attended time after the sheet medium is output to the discharge tray until the sheet medium is removed is short or not, and
        after outputting the printing data of which the unattended time is inferred to be short, decrements the count number.

2. The image forming apparatus according to claim 1, wherein
the control portion, after outputting the printing data of which the unattended time is inferred to be short, sets the count number at zero.

3. The image forming apparatus according to claim 1, wherein
the control portion, after outputting the printing data of which the unattended time is inferred to be short, decrements the count number by a number of a sheet medium output based on the printing data.

4. The image forming apparatus according to claim 1, wherein
the control portion infers whether the unattended time is short or not based on a setting for a printing job which has generated the printing data.

5. The image forming apparatus according to claim 4, wherein
when a printing job is executed, at least either of an interrupt function and a test printing function is set, and
the control portion infers that the unattended time of the printing data for the printing job using the interrupt function or the test printing function is short.

6. The image forming apparatus according to claim 1, wherein
the control portion infers whether the unattended time is short or not based on a transmission source of a printing job corresponding to the printing data.

7. The image forming apparatus according to claim 1, wherein
the control portion infers whether the unattended time is short or not based on a distance between a transmission source of a printing job corresponding to the printing data and the image forming apparatus or based on the unattended time of past output from the transmission source.

8. The image forming apparatus according to claim 1, wherein
the control portion infers whether the unattended time is short or not based on timing of operation for executing a printing job corresponding to the printing data.

9. The image forming apparatus according to claim 1, further comprising a printing data analysis portion which recognizes character strings and symbols included in the image based on the printing data,
wherein
when a specific character string, which is a prescribed character string, or a specific symbol, which is a prescribed symbol, is recognized in the image based on the printing data, the control portion infers that the unattended time of the printing data is short.

10. The image forming apparatus according to claim 1, wherein
a delay time secured after output of the printing data of which the unattended time is inferred to be short before the count number is decremented is adjustable.

11. The image forming apparatus according to claim 2, wherein
a delay time secured after output of the printing data of which the unattended time is inferred to be short before the count number is decremented is adjustable.

12. The image forming apparatus according to claim 3, wherein
a delay time secured after output of the printing data of which the unattended time is inferred to be short before the count number is decremented is adjustable.

13. The image forming apparatus according to claim 4, wherein
a delay time secured after output of the printing data of which the unattended time is inferred to be short before the count number is decremented is adjustable.

14. The image forming apparatus according to claim 5, wherein
a delay time secured after output of the printing data of which the unattended time is inferred to be short before the count number is decremented is adjustable.

15. The image forming apparatus according to claim 6
wherein
a delay time secured after output of the printing data of which the unattended time is inferred to be short before the count number is decremented is adjustable.

16. The image forming apparatus according to claim 7, wherein
a delay time secured after output of the printing data of which the unattended time is inferred to be short before the count number is decremented is adjustable.

17. The image forming apparatus according to claim 8, wherein
a delay time secured after output of the printing data of which the unattended time is inferred to be short before the count number is decremented is adjustable.

18. The image forming apparatus according to claim 9, wherein
a delay time secured after output of the printing data of which the unattended time is inferred to be short before the count number is decremented is adjustable.

* * * * *